Oct. 14, 1952  E. K. STODOLA  2,614,250
MOVING TARGET PULSE ECHO MEASURING SYSTEM
Filed June 29, 1948  2 SHEETS—SHEET 1
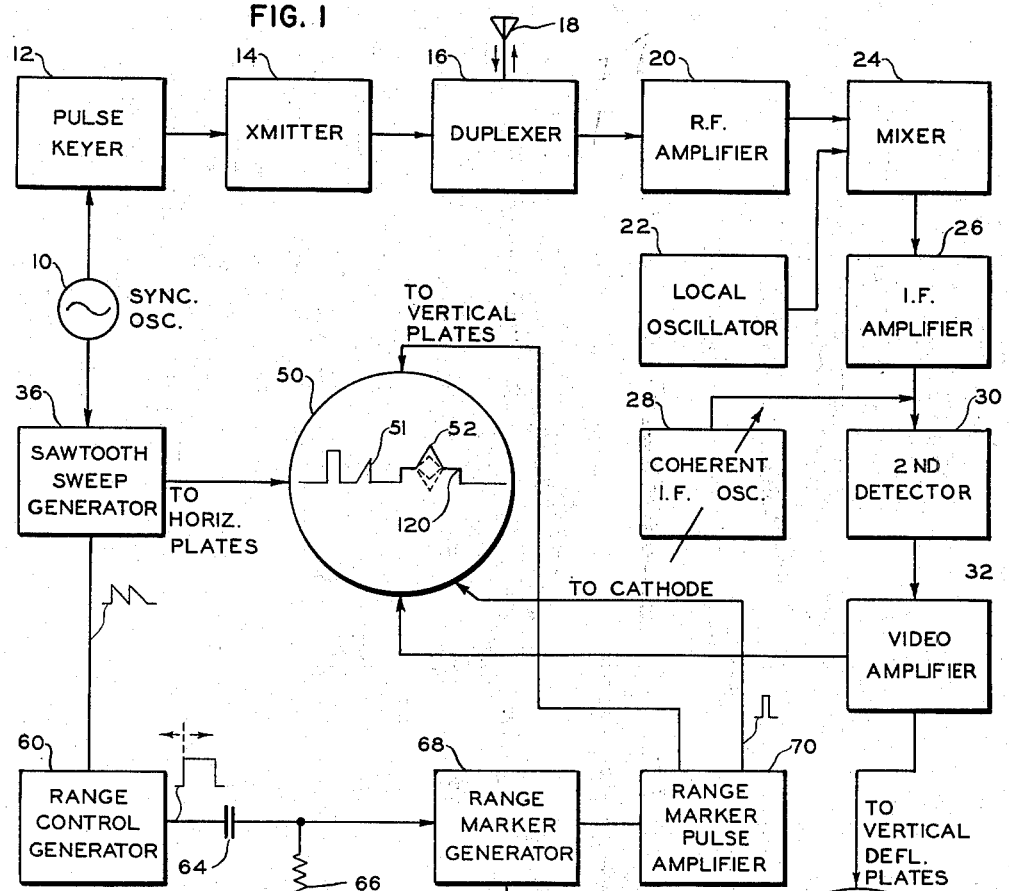
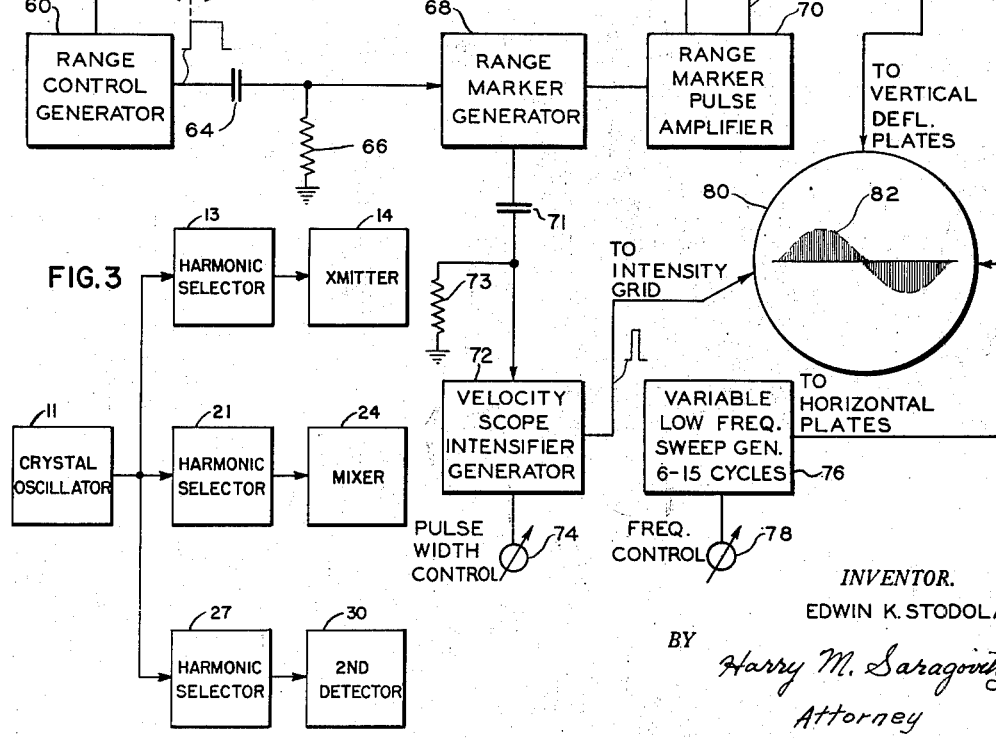
INVENTOR.
EDWIN K. STODOLA
BY
Harry M. Saragovitz
Attorney Patented Oct. 14, 1952

2,614,250

UNITED STATES PATENT OFFICE 2,614,250

MOVING TARGET PULSE ECHO MEASURING SYSTEM

Edwin K. Stodola, Neptune, N. J., assignor to the United States of America as represented by the Secretary of War Application June 29, 1948, Serial No. 35,956

14 Claims. (Cl. 343—8)

(Granted under the act of March 3, 1883, as amended April 30, 1928; 370 O. G. 757)

The invention described in the following specification and claims may be manufactured and used by or for the Government for governmental purposes, without the payment to me of any royalty thereon.

My invention relates generally to signal indicators. Although not restricted thereto, my invention is particularly suitable for use as an indicator in pulse-echo object locating systems to indicate and distinguish between fixed and moving targets and to determine the relative velocity and the direction of motion of the targets.

In the application of the Doppler principle to pulse-echo object locating systems, a spaced wave-train pulses are transmitted, and the echoes thereof received from targets are mixed in a detector with the output of a stable oscillator, which provides a reference oscillation of constant frequency and coherent in phase with the oscillations of the transmitted wave trains. The resultant detected output will be of constant amplitude and polarity for fixed targets, while for moving targets the resultant output will be continuously changing in amplitude and polarity.

Previously there was used to display such signals an oscilloscope in which the time base was provided by deflecting the cathode ray trace horizontally in timed relation with each transmitted pulse, while received echoes were used to vertically deflect the trace to provide vertical pips of a height proportional to the amplitude of the echoes. Therefore, for fixed targets the height of the pips was constant, but for moving targets the pips would continuously vary in amplitude above and below the base line. When a plurality of echoes from moving targets were received it was difficult for the observer to distinguish between systemic variations, random variations due to other causes, and variations which were due to movement of the target. Strong echoes from targets near the moving target, because of their brightness on the screen, would mask the moving target signal.

Moreover, if the rate of amplitude variations exceeded either the persistence of vision factor or the cathode ray tube screen persistence factor, the signal pip would appear to have a constant height even for varying amplitude signals.

With this prior method of display, determination of the relative velocity of a moving target were made by timing the rate of "bobbing" of the pips from the moving target but, in view of the display difficulties as above stated and in view of the difficulty of detecting exactly when the bobbing pip had returned to the starting height from which its timing was commenced, the method was inaccurate at best and often was not feasible.

It is therefore a principal object of my invention to provide novel signal display means whereby the signals from stationary and moving objects may be more readily distinguished.

It is a further object of my invention to provide novel signal display means whereby the velocity and distance of remote moving objects and the direction of such motion may be readily determined.

It is a further object of my invention to provide novel signal display means whereby signals from moving objects may be readily distinguished in the presence of strong masking signals.

It is a further object of my invention to provide a novel signal display means that may be used in combination with previous pulse-echo object locating display systems.

For a better understanding of my invention together with other and further objects thereof, reference is had to the following description taken in connection with the accompanying drawings forming a part of this application, in which:

Fig. 1 is a block diagram showing one embodiment of my invention;

Fig. 3 is a block diagram showing apparatus for supplying high frequency oscillations to the transmitter and the mixers of the receiver.

Figure 2:
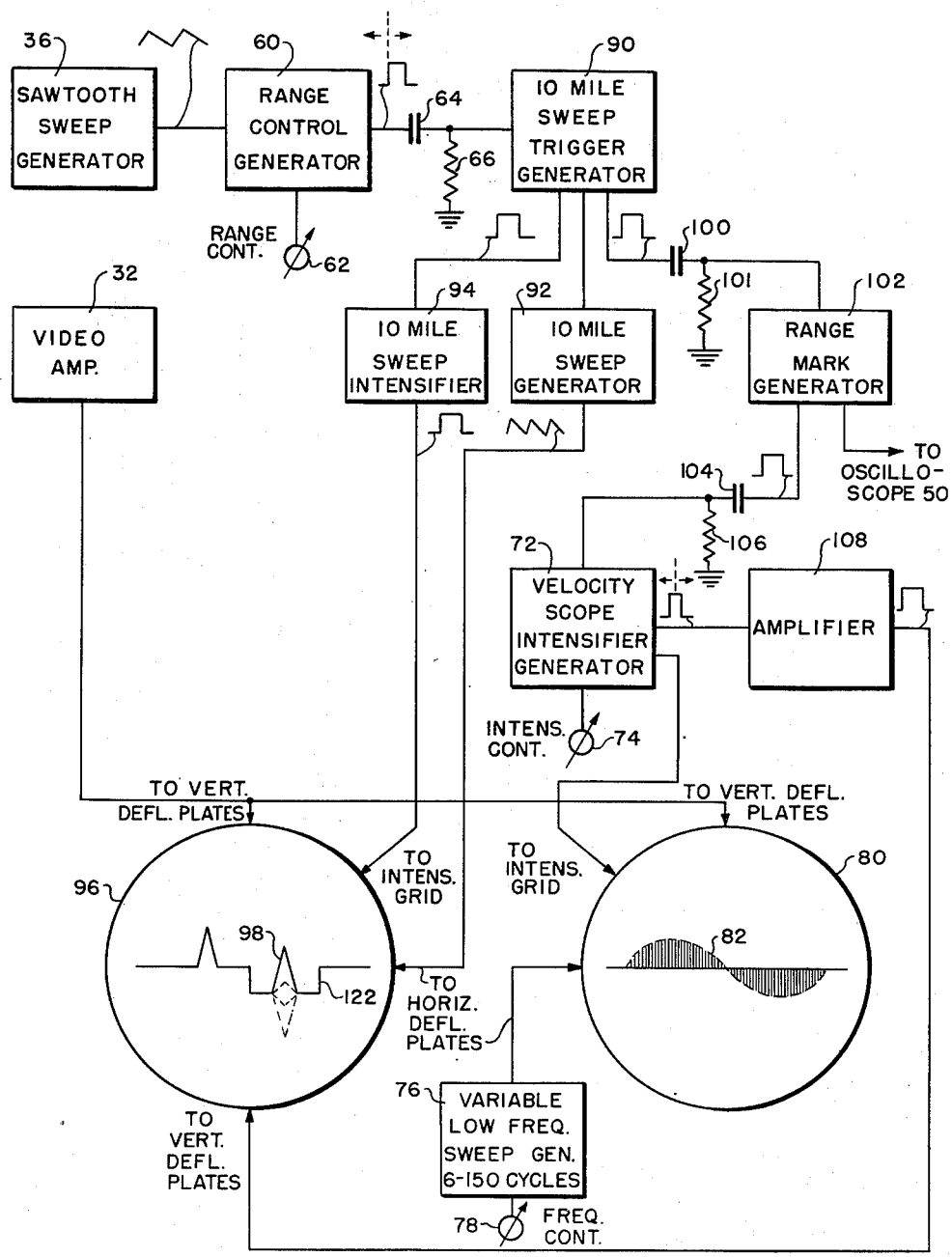
Fig. 2 is a block diagram showing another embodiment of my invention.

Reference is now made particularly to Fig. 1 in which there is shown a radio pulse transmitter 14 which is periodically keyed under the control of a relatively low frequency sine-wave synchronizing oscillator 10 usually operating in the audio frequency region, e. g., 600 cycles per second. The radio transmitter frequency may be any used in conventional radar systems, e. g., from 100 megacycles and upwards. The output of oscillator 10 is applied to a pulse keyer 12 which, at every one or more cycles from oscillator 10, generates sharp pulses of short duration spaced at intervals of considerably longer duration. The pulses from keyer 12 intermittently render operative the normally-quiescent radio transmitter 14 which generates spaced, radio-frequency wave trains of a duration substantially equal to that of said pulses, generally from 1–30 microseconds. As is well known, the pulse-repetition period or the intervals between successive pulses are dependent upon the maximum target range to be measured.

The output of the transmitter is radiated by an antenna 18, which is usually a unidirectional array adjustable in direction. Echoes are also received on said antenna and impressed upon the receiver. Both the transmitter and receiver are coupled to the antenna through a duplexer 16 which couples the antenna to the transmitter and considerably decouples it from the receiver during pulse transmission, and couples the antenna to the receiver and decouples it from the transmitter during reception. The receiver is preferably of the superheterodyne type and includes a radio frequency amplifier 20, a local oscillator 22, a mixer 24, an intermediate frequency amplifier 26, a second detector 30, and a video amplifier 32. In the detector 30, the intermediate frequency output of amplifier 26 is mixed with the output of the coherent oscillator 28 which is stable in frequency and may be adjustably tuned to a frequency equal to or near the intermediate frequency. Oscillator 28 may be slightly detuned from the intermediate frequency, provided that it supplies a wave which is coherent in phase, i. e., of constant reference phase, with respect to the oscillations of the intermediate-frequency wave trains.

For best results the reference phase of the initial oscillation of each wave train generated by transmitter 14 should be held constant with respect to the oscillations of the coherent oscillator 28. This can be accomplished by stabilizing the frequencies of these oscillators by any of the methods known in the art. One eminently satisfactory method of doing this is to make the frequencies of these oscillators harmonically related to each other by using selected harmonics of a single crystal oscillator to provide the local oscillation frequency applied to mixer 24, the coherent oscillation frequency applied to second detector 30, and the frequency stabilizing signal to be injected into a tuned circuit of the oscillator in transmitter 14. The above-described apparatus for supplying local oscillations to the mixer 24 and second detector 30 and for synchronizing the transmitter 14 is shown in Fig. 3. The local crystal oscillator 11 is connected to a plurality of harmonic frequency selectors or generators 13, 21, and 27, which derive from the oscillations of crystal oscillator 11, suitable harmonic frequencies for synchronizing transmitter 14 and supplying oscillations of the required frequency to the mixer 24 and the second detector 30. It will be understood that the harmonic selectors or generators 13, 21, and 27 may include such amplifiers, frequency multipliers, and filters as are commonly used in the art for obtaining harmonic frequencies of desired amplitudes.

When echoes arrive from a fixed target, the frequency, and hence the phase, thereof will be constant, and the resultant of these echo waves mixed with the output of oscillator 28 will be of relatively fixed amplitude. On the other hand, when echoes are received from a target having a component of motion toward or away from the observer, the received waves will be characterized by a progressive change in phase with respect to the transmitted signal, due to the fact that, in the case of a receding target, each succeeding transmitted wave train travels further to the moving target and back to the transmitter than the preceding transmitted wave train; while, in the case of an approaching target, each succeeding wave train travels a shorter distance to the target and back than its predecessor. This phenomenon is known as the Doppler effect.

This signal of changing phase, when mixed with the constant reference phase of coherent oscillator 28, yields in the output of detector 30 a demodulated pulse signal which continuously changes in amplitude and polarity and exhibits, in the case of a target moving with uniform radial velocity, a generally sinusoidal variation in amplitude, i. e., an amplitude modulation, of a frequency depending upon the radial velocity of the moving target. This signal is then amplified by video amplifier 32 and applied to the vertical deflection plates of oscilloscope tubes 50 and 80, only the screens of which are represented in the drawing.

Synchronizing oscillator 10 also controls a sawtooth sweep generator 36. At every cycle of output of oscillator 10, and hence every time a pulse from transmitter 14 is radiated, generator 36 provides a sawtooth wave which is applied to the horizontal deflecting plates of oscilloscope tube 50 to provide a synchronized time base having a duration which is at most equal to the pulse repetition period.

As thus far described the transmitted pulses and the echoes thereof will appear in the receiver output and cause vertical deflections of the cathode ray beam of tube 50, which appear as pips on the screen, the separation between the pips due to the transmitted pulses and the pips due to the echoes depending, as is well known, upon the range of the target. The pips from the transmitted pulse and echoes 51 from stationary targets will be of a constant height, while the pips 52 from a moving target will constantly vary in height above and below the time base line.

For the purposes of my invention, the output of the sawtooth sweep generator 36 is also applied to a range control generator 60, whose function is to generate a positive square wave pulse whose leading edge may be positioned at any point on the time base. The positioning of this leading edge is controlled by means of range control 60. Such a range control generator may take many forms well known in the art, but I prefer to use a "one shot" multivibrator arranged to "fire" at the beginning of the time base sawtooth wave and to cease "firing" at any desired time during the time base sawtooth wave as determined by a controlled variable bias arrangement. This produces a square wave with a leading edge coincident with the "firing" of the multivibrator and with a lagging edge which occurs whenever the multivibrator ceases "firing." By a suitable selection of the multivibrator electrode from which the output is taken, a positive square wave with the leading and lagging edge interchanged is obtained. This output square wave is in effect one with a leading edge occurring at any desired time along the time base after the transmitter 14 has been pulsed.

This range control wave is then differentiated by means of condenser 64 and resistor 66. The differentiated wave is impressed on the range marker generator 68 which generates a very narrow square wave pulse. Range marker generator 68 may comprise another "one shot" multivibrator which is "fired" by the differentiated wave or effectively by the leading edge of the output wave of range control generator 60. A portion of the output of range marker generator 68, is amplified by range marker pulse amplifier 70. The output of this amplifier is then coupled to the vertical deflection plates and to the cathode of oscilloscope 50. The result is that, at the range selected by means of range control 62, there will be displayed a pip 52 on oscilloscope 50 which is brighter than the other pips and also slightly vertically displaced from the horizontal time base than the other pips; i. e., the desired pip is either "pedestalled" or "notched," depending upon the polarity of the pulse and the direction in which it is applied to the vertical plates. As shown herein, the range marker is a pedestal 120.

Another portion of the output of range marker generator 68 is differentiated by condenser 71 and resistor 73, and the differentiated wave is impressed upon a velocity oscilloscope intensifier generator 72 whose function is to generate a square wave pulse with a fixed leading edge and of a slightly variable width obtained by varying the position of the trailing edge of the square wave pulse. I prefer making the duration of this intensifying pulse variable between five and twenty-five microseconds by means of a control 74, but it may be any width required both for short range search purposes and for keeping a moving target visible on the screen. This intensifier pulse generator 72 may also be a "one shot" multivibrator fired by the differentiated wave impressed upon it, with the pulse width varied by a variable bias. The output from the velocity intensifier generator 72 is therefore a square wave pulse whose leading edge also occurs effectively at the same time as the leading edge of the output wave of range control generator 60.

A portion of the output of video amplifier 32 is impressed on the vertical deflection plates of velocity indicating oscilloscope 80. A time base which has a period which is much longer than the repetition period of the transmitted wave trains is provided by a variable low frequency sawtooth sweep generator 76, whose frequency is controlled by the frequency control 78. The sweep generator 76 may have any frequency range. Preferably its frequency is variable from 6 to 150 cycles per second, but it may be 6 to 150 cycles different from the repetition rate of the transmitted pulses. The output of the variable low frequency sweep generator 76 is impressed on the horizontal deflection plates of oscilloscope 80. The output of the intensifier generator 72 is impressed upon the intensity grid of oscilloscope 80.

The video amplifier 32 supplies all the echo signals to the oscilloscope 80, but only those signals will be seen which are intensified by the output of the intensifier generator 72. When echo signals from a fixed target are intensified they cause a vertical presentation of a fixed height to appear on the screen of oscilloscope 80. A series of vertical pips of the same height, each representing an echo from the same target, will appear across the screen of the oscilloscope 80 because the period of the sweep signal from variable low frequency sweep generator 70 is a multiple of the transmitted pulse repetition period. When echo signals from a moving target are intensified, a vertical presentation of varying height appears and, with a sweep signal having the above characteristics, pips from the same target of progressively varying vertical heights appear on the screen of oscilloscope 80. The overall outline of the pattern is generally sinusoidal as shown at 82, and, as previously mentioned, the frequency of this sine wave pattern is dependent upon the radial velocity of the target. By means of the frequency control 78, a single cycle of this sine wave pattern 82, or any recognizable fraction or multiple of a single cycle, e. g., a half cycle of any multiple thereof, may be displayed on the oscilloscope 80. The frequency of the time base is then in direct relationship to the radial component of the velocity of the moving target. As the target moves radially through a distance equivalent to one half the transmitted pulse wavelength, the oscillations of the echo pulses received undergo a 360 degrees change in phase with respect to the oscillations of the fixed coherent oscillator 28. Since the frequency of this phase change is directly proportional to the radial velocity of the target, the product of the frequency of the phase change and one half the wavelength of the oscillations of the transmitted pulse gives the radial velocity of the moving target. The frequency control 78 may be calibrated in any appropriate units, but I prefer to calibrate it in miles per hour.

It will therefore be seen that by means of my invention the complete target range as displayed on oscilloscope 50 may be explored and investigated for moving targets, with the distance to the target shown on the range control and the particular target being investigated being clearly indicated on the screen of oscilloscope 50. A moving target echo is clearly distinguished from all other masking echoes by the characteristic sine wave pattern which appears on oscilloscope 80. The radial velocity component may then be easily read on the calibrated frequency control 78.

Fig. 2 shows a more detailed embodiment of my invention. It will be understood that all the components indicated by reference numerals 10 through 36, and their interconnection shown in Fig. 1 will also be used in Fig. 2, but for the sake of simplicity, only components 32 and 36 are shown in Fig. 2, since only the succeeding circuit arrangement is modified. Other components in Fig. 2 which are similar in structure and function as those in Fig. 1 are labelled with the same numerals.

Fig. 2 shows the use of my invention in combination with a signal indicator 96 which is used to search any desired portion of the range shown on the signal indicator 50 of Fig. 1. For ease in description, assume that the maximum target range, displayed on oscilloscope 50, is 150 miles and the target range displayed on oscilloscope 96 is any 10 mile portion thereof.

In Fig. 2 a portion of the output of the sawtooth sweep generator 36 is impressed upon range control generator 60 which, as previously explained, generates a range control square wave pulse with a variably timed leading edge, whose position, with reference to the beginning of the principal time base sweep, is controlled by range control 62. This square wave is differentiated by condenser 64 and resistor 66. The differentiated wave is applied to a shorter range, e. g., a 10 mile range, sweep trigger generator 90, which, in response to said differentiated wave generates a sweep trigger, square wave pulse whose duration corresponds to a range of 10 miles, and whose leading edge is synchronous with the leading edge of the square wave output of range control generator 60. This 10 mile sweep trigger pulse is amplified by amplifier 94 and impressed on the intensifier grid of oscilloscope tube 96. The 10 mile sweep trigger pulse is also applied to sweep generator 92 which converts the pulse into a 10 mile sawtooth wave which is applied to the horizontal deflection plates of oscilloscope 96 to provide a 10 mile time base. Echo signals from video amplifier 32 are impressed on the vertical deflection plates of oscilloscope 96.

The video signals from the entire 150 mile range are impressed on the vertical deflection plates of oscilloscope 96, but only those pulse-echo signals which are within a selected 10 mile range are intensified by the 10 mile sweep intensifier 94 and are displayed on the screen of oscilloscope 96. The portion of the 150 mile range of oscilloscope 50 which is displayed by oscilloscope 99 is controlled by variation of the timing of the leading edge of the square wave generated by range control generator 60.

A third portion of the output of the 10 mile sweep trigger generator 90 is differentiated by condenser 100 and resistor 101 and impressed upon range mark generator 102 which generates a range mark square wave whose leading edge occurs in the center of the 10 mile sweep trigger pulse and whose duration corresponds to approximately 5 miles. A portion of the output of generator 102 is differentiated by condenser 104 and resistor 106 and then applied to the velocity oscilloscope intensifier generator 72.

In response to this differentiated wave, the intensifier generator 72, as previously explained, generates a square wave pulse with a slightly adjustable lagging edge which is applied to the intensifier grid of oscilloscope 80. It should be noted that the leading edge of this square wave pulse is in the center of the 10 mile sweep and therefore occurs 5 miles after the leading edge of the output square wave of range control generator 60. Pulse echo signals from video amplifier 32 are applied to the vertical deflection plates of oscilloscope 80 and a time base is generated by variable low frequency sweep generator 76 and applied to the horizontal deflection plates of oscilloscope 80, as previously explained.

A second portion of the output of the velocity intensifier generator 72 is amplified at 108 and applied to the vertical deflection plates of oscilloscope tube 96, to produce a notch 122 on the base line. The target echo displayed on oscilloscope 80 is thereby precisely located and shown with reference to the 10 mile range by adjusting notch 120 along the base line until it coincides with the desired echo display, as shown in the drawing. Moving target echoes displayed on oscilloscope 96 are identified from stationary target echoes by the bobbing of the pips. The radial velocity of very slow moving targets may be obtained by timing the bobbing of these pips.

A portion of the output from range mark generator 102 may be taken and impressed upon oscilloscope 50 in a similar fashion as was described for Fig. 1 for the signal from range marker pulse amplifier 70, thus providing a marker on the targets displayed by oscilloscope 50.

I have disclosed how my invention may be used with two other signal indicating devices which conveniently give an indication of the distance of the moving target being observed. This is not to be construed as a limitation upon the use of my invention since it can be used with other types of signal indicators, or even independently of any other signal indicators, to detect and distinguish moving targets by their characteristic sine wave pattern, the distance of said targets being indicated by the calibrations on range control 62, and their radial velocity being indicated by the calibrations on frequency control 78. If the moving target is a motor driven aircraft, some distortion of the sine wave pattern may occur due to maneuvers of said craft or to reflections from its propellers, but the wave shown is distinct and recognizable, and the radial velocity of the plane is readily obtained by varying the frequency sweep generator 76 until a single cycle or recognizable portion of a single cycle of the sine wave pattern is shown on oscilloscope 80.

While I have shown and described a preferred method and apparatus for gating a desired echo pulse by applying a gating pulse to the last stage of the receiver, namely the cathode ray tube, this is not to be construed as a limitation since it will be evident to those skilled in the art that the gating may be effected in other stages of the receiver.

The direction of the radial motion of the target may be determined with this system by slightly shifting the frequency of the coherent oscillator 28 with respect to the I. F. frequency of the receiver. If the coherent I. F. oscillator frequency is raised and the velocity of the target whose echoes are displayed on oscilloscope 80 appears to decrease, the target is approaching. If the velocity of the target appears to increase, then the target is receding. Of course the opposite conclusions are to be drawn when the I. F. coherent oscillator frequency is reduced. The above directions of frequency change will hold where the frequency conversion in the superheterodyne receiver is such that an increase in the signal frequency results in an increase in the intermediate frequency. If the reverse is true, then the frequency changes for approaching and receding targets will be interchanged.

Another method of indicating the directional sense of the radial velocity component is to set the frequency of the coherent I. F. oscillator 28 to a frequency slightly different from the I. F. signal from a fixed target. Under such conditions, the signal from a fixed target in oscilloscope 80 is indicated by a sinusoidal outline having a frequency equal to the difference in frequency between said I. F. signal and the coherent oscillator frequency. The frequency of the outline pattern for targets moving one direction will then be higher than said frequency for fixed targets, while for targets moving in the opposite direction will be lower. Whether a given frequency for a target moving in a particular direction is higher or lower, depends upon the frequency conversion relations in the receiver and whether the coherent oscillator frequency is above or below the frequency corresponding to fixed targets. Under the conditions above described, if the phase of the vector representing, say the initial oscillation of, the fixed target pulse is compared with the phase of the coherent oscillator output at the same instant, said phase will be found to change from pulse to pulse at a uniform time rate.

It will be understood that the usual means will be provided for adjusting the electrode potentials of the oscilloscopes 50, 80 and 96 and for blanking the return trace of the cathode ray beam.

From the above description it will be appreciated that my invention provides a novel indicator for differentiating between pulse signals of fixed and varying amplitude and is particularly suitable for use with an object-detection system incorporating a coherent oscillator for detecting the Doppler modulation characteristic of the echoes from a moving target, and obtaining the radial velocity of the target therefrom.

The term "echo" as used herein is not to be restricted to signals which are reflected or passively reradiated by a body. This term is also used to signify any automatic response to a signal, e. g., that obtained by means of a normally inoperative transmitter located on said body, which, when keyed by a pulse transmitted toward said body, automatically functions to send an answering pulse, either on the same frequency as said transmitted pulse or on a different frequency.

While there has been described what is at present considered a preferred embodiment of the invention, it will be obvious to those skilled in the art that various changes and modifications may be made therein without departing from the invention.

I claim:

1. In a pulse-echo object detecting system wherein spaced wave trains are radiated and wherein received echoes from a moving target produce successive pulses characterized by an amplitude modulation having a period dependent upon the radial velocity of said moving target; means for displaying said moving target echoes comprising means for isolating the successive pulses from a single target, means for generating a cathode ray indicating beam, means controlled by said isolated pulses for deflecting said beam along one coordinate, means for periodically deflecting said beam along a second coordinate to provide a time base, and means for varying the period of said time base until a stationary pattern of the envelope of said amplitude modulation is indicated by said indicating beam.

2. In a pulse-echo object detecting system wherein spaced wave trains are radiated and wherein received echoes from a moving target produce successive pulses characterized by an amplitude modulation having a period dependent upon the radial velocity of said moving target; means for displaying said moving target echoes comprising means for isolating the successive pulses from a single target, means for generating a cathode ray indicating beam in synchronism with the occurrence of each pulse, means controlled by said isolated pulses for deflecting said beam along one coordinate, means for periodically deflecting said beam along a second coordinate to provide a time base, and means for varying the period of said time base until a stationary pattern of the envelope of said amplitude modulation is indicated by said indicating beam.

3. In a pulse-echo object detecting system wherein spaced wave trains having a predetermined repetition period are radiated and wherein received echoes from a moving target produce successive pulses characterized by an amplitude modulation having a period dependent upon the radial velocity of said moving target; means for displaying said moving target echoes comprising means for generating a cathode-ray indicating beam in synchronism with the occurrence of each pulse, means controlled by said pulses for deflecting said beam along one coordinate, means for periodically deflecting said beam along a second coordinate to provide a time base having a period which is of considerably longer duration than said repetition period, and means for varying the period of said time base until a stationary pattern of one cycle of the envelope of said amplitude modulation is indicated by said indicating beam.

4. In a pulse-echo object detecting system wherein spaced wave trains are radiated and wherein received echoes from a fixed target provide pulses of fixed amplitude, while echoes from a moving target provide pulses characterized by an amplitude modulation having a period dependent upon the radial velocity of said moving target; means for distinguishing said moving target echoes comprising means for displaying the echoes of all targets, means for generating marker pulses at adjustable time intervals relative to the time of transmission of said wave trains, means for displaying said marker pulses together with said echoes, means for adjusting the timing of said marker pulses until they substantially coincide with a desired one of the displayed echoes, means controlled by said marker pulses for isolating the successive pulses corresponding to said desired echo, means for generating a cathode ray indicating beam, means controlled by the isolated pulses for deflecting said beam along one coordinate, means for deflecting said beam along a second coordinate at a periodic rate to provide a time base, and means for changing said periodic rate until a stationary pattern of the envelope of said amplitude modulation is indicated by said indicating beam.

5. In a pulse-echo object detecting system wherein spaced wave trains are radiated and wherein received echoes from a fixed target provide pulses of fixed amplitude, while echoes from a moving target provide pulses characterized by an amplitude modulation having a period dependent upon the radial velocity of said moving target; means for distinguishing said moving target echoes comprising means for displaying the echoes of all targets, means for generating marker pulses at adjustable time intervals relative to the time of transmission of said wave trains, means for displaying said marker pulses together with said echoes, means for adjusting the timing of said marker pulses until they substantially coincide with a desired one of the displayed echoes, means controlled by said marker pulses for isolating the successive pulses corresponding to said desired echo, means for generating a cathode ray indicating beam, means controlled by said isolated pulses for deflecting said beam along one coordinate, means for deflecting said beam along a second coordinate at a periodic rate to provide a time base, and means for changing said periodic rate until a stationary pattern of the envelope of said amplitude modulation is indicated by said indicating beam, the last-named means being calibrated to indicate said radial velocity as a function of said periodic rate when said stationary pattern is indicated.

6. A pulse-echo object detection system comprising means for transmitting spaced trains of wave energy having a predetermined fixed frequency, means for receiving echoes of said wave trains from a moving target, means for generating oscillations of a frequency substantially equal to that of said echoes, means for mixing said echoes with said oscillations to provide pulses characterized by an amplitude modulation having a period dependent upon the radial velocity of said moving target, means for generating an indicating beam, means controlled by said pulses for deflecting said beam along one coordinate, means for deflecting said beam along a second coordinate at a periodic rate to provide a time base, means for varying said periodic rate until a stationary pattern of the envelope of said amplitude modulation is indicated by said indicating beam, and means for indicating the direction of said radial velocity, the last-named means comprising means for varying the frequency of said oscillations.

7. A pulse-echo object detection system comprising means for transmitting spaced trains of wave energy having a predetermined frequency, means for receiving echoes of said wave trains from a moving target, means for generating oscillations of a frequency equal to that of said echoes, means for mixing said echoes with said oscillations to provide pulses characterized by an amplitude modulation having a period dependent upon the radial velocity of said moving target, means for generating an indicating beam, means controlled by said pulses for deflecting said beam along one coordinate, means for periodically deflecting said beam along a second coordinate to provide a time base, means for varying the period of said time base until a stationary pattern of the envelope of said amplitude modulation is indicated by said indicating beam, the last named means being calibrated to indicate said radial velocity as a function of said period when said stationary pattern is indicated, and means for indicating the sense of said radial velocity comprising means for varying said frequency of said oscillations.

8. In a pulse-echo object detecting system, means for radiating spaced trains of wave energy, each train having a plurality of oscillations; means for receiving echoes of said wave trains from a moving target; means for converting said echoes to pulses which successively vary in amplitude at a rate dependent upon the radial velocity of said moving target, said last named means comprising an oscillator for generating a wave having a frequency substantially equal to that of said oscillations, and means for mixing said wave with said oscillations to derive said pulses; and means for displaying said pulses, said last named means comprising a cathode ray oscilloscope, means responsive to said pulses for deflecting the beam of said oscilloscope along one coordinate, a sweep generator for deflecting said beam along a second coordinate to provide a time base, and control means for changing the frequency of said sweep generator until a stationary pattern of the envelope of amplitude variation of said pulses is indicated by said indicating beam, said control means being calibrated to indicate said radial velocity, and means to vary the frequency of said oscillator to indicate the sign of said radial velocity.

9. In a pulse-echo object detecting system, means for radiating spaced trains of wave energy, each train having a plurality of oscillations; means for receiving echoes of said wave trains from a moving target; means for converting said echoes to pulses which successively vary in amplitude at a rate dependent upon the radial velocity of said moving target, said last named means comprising a coherent oscillator for generating a wave having a frequency substantially equal to that of said oscillations, and means for mixing said wave with said oscillations to derive said pulses; and means for displaying said pulses, said last named means comprising a cathode ray oscilloscope, means responsive to said pulses for deflecting the beam of said oscilloscope along one coordinate, a sweep generator for deflecting said beam along a second coordinate to provide a time base, and control means for changing the frequency of said sweep generator until a stationary pattern of the envelope of amplitude variation of said pulses is indicated by said indicating beam, said control means being calibrated to indicate said radial velocity.

10. In a pulse-echo object detecting system, means for radiating spaced trains of wave energy, each train having a plurality of oscillations; means for receiving echoes of said wave trains from a moving target; means for converting said echoes to pulses which successively vary in amplitude at a rate dependent upon the radial velocity of said moving target, said last named means comprising a coherent oscillator for generating a wave having a frequency substantially equal to that of said oscillations, and means for mixing said wave with said oscillations to derive said pulses; and means for displaying said pulses, said last named means comprising a cathode ray oscilloscope, means responsive to said pulses for deflecting the beam of said oscilloscope along one coordinate, a sweep generator for deflecting said beam along a second coordinate to provide a time base, and control means for changing the frequency of said sweep generator until a stationary pattern of the envelope of amplitude variation of said pulses is indicated by said indicating beam, said control means being calibrated to indicate said radial velocity, and means to vary the frequency of said coherent oscillator to determine the sign of said radial velocity.

11. A velocity-measuring pulse echo system comprising means for generating continuous oscillations of constant frequency, pulse transmitting means controlled by said generated oscillations for radiating pulses of ultra-high frequency energy toward a remote object, said pulses each having a duration long as compared to the period of said oscillations, pulse receiving means for receiving corresponding pulses of ultra-high frequency oscillations reflected from said object, means for deriving second constant frequency oscillations from said generated oscillations, means for combining said reflected oscillations with said second oscillations, means responsive to any difference frequency between said combined oscillation for developing a pulse voltage at said difference frequency, a cathode ray device having a viewing screen, a sweep voltage generator operable over a range of low frequencies comparable to said difference frequency, means for deflecting said ray in one direction in response to said pulse voltage and in another direction in response to said sweep voltage, and means for independently adjusting the frequency of said sweep generator so that said ray traces a stationary pattern on said screen when the frequencies of said voltages have an integral ratio, whereby said relative velocity may be determined from said sweep frequency.

12. A velocity-measuring pulse echo system comprising a generator of continuous high frequency oscillations of constant frequency, a pulse transmitter synchronized from said generator and adapted to radiate pulses of ultra-high frequency energy toward a remote object, said pulses each having a duration long as compared to the period of said oscillations, a pulse receiver adapted to be energized by corresponding pulses of ultra-high frequency oscillations reflected from said object, a source of second constant frequency oscillations, said receiver including a mixer for combining said reflected oscillations with said second oscillations, means responsive to any difference frequency between said combined oscillations, due to relative velocity of said remote objet with respect to said system, for developing a pulse voltage at said difference frequency, a cathode ray device having a pair of coordinate ray deflecting elements and a viewing screen, means for impressing said pulse voltage on one of said elements, a sweep generator operable over a range of relatively low frequencies comparable to said difference frequency, means for impressing the output of said sweep generator on the other of said elements, and frequency control means for independently adjusting the frequency of said sweep generator to cause said ray to trace a predetermined stationary pattern on said screen, whereby said relative velocity may be determined from said sweep frequency.

13. A velocity-measuring pulse echo system comprising a generator of continuous oscillations of constant frequency, a pulse transmitter controlled by said generator for radiating pulses of ultra-high frequency energy toward remote reflecting objects, said pulses each having a duration long as compared to the period of said oscillations, a pulse receiver for receiving corresponding pulses of ultra-high frequency oscillations from said remote objects after time intervals determined by their ranges, a source of second constant frequency oscillations, a mixer for combining said reflected oscillations and said second oscillations, adjustable range gating means for rendering said receiver operative only during a selected range interval, means responsive to any difference frequency between combined oscillations occurring during said interval due to a reflecting object within said interval for developing a pulse voltage at said difference frequency, a cathode ray device having a viewing screen, a sweep voltage generator operable over a range of low frequencies comparable to said difference frequency, means for deflecting said ray in one direction in response to said pulse voltage and in another direction in response to said sweep voltage, and means for independently adjusting the frequency of said sweep generator so that said ray traces a stationary pattern on said screen when the frequencies of said voltages have an integral ratio, whereby said relative velocity may be determined from said sweep frequency.

14. Apparatus for measuring relative velocity between a pulse echo system and a remote reflecting object comprising a source of oscillations of a predetermined, constant frequency, means for transmitting discontinuous pulses of ultra-high frequency oscillations toward said object from said system, means for receiving echoes of said pulses at said system, means for mixing said echoes with oscillations from said source and developing a pulse voltage proportional to their difference frequency, a cathode ray device having a pair of coordinate ray deflecting elements and a viewing screen, a sweep wave generator adjustable over a range of low frequencies comparable to said difference frequency, means for energizing said pair of elements from said pulse voltage and said generator respectively, and means for independently adjusting said sweep frequency, whereby said ray traces a stationary pattern from which said velocity may be determined when said difference frequency and sweep frequency have an integral relationship.

EDWIN K. STODOLA.

REFERENCES CITED

The following references are of record in the file of this patent:

UNITED STATES PATENTS

| Number | Name | Date |
| --- | --- | --- |
| 2,283,616 | Slonczeroski | May 19, 1942 |
| 2,321,315 | Peterson | June 8, 1943 |
| 2,416,088 | Deerhake | Feb. 18, 1947 |
| 2,422,064 | Anderson et al. | June 10, 1947 |
| 2,423,023 | Hershberger | June 24, 1947 |
| 2,433,341 | Busignies | Dec. 30, 1947 |
| 2,450,945 | Eaton | Oct. 12, 1948 |
| 2,455,265 | Norgaard | Nov. 30, 1948 |
| 2,461,998 | Patterson | Feb. 15, 1949 |
| 2,479,568 | Hansen | Aug. 23, 1949 |
| 2,514,924 | Becker | July 11, 1950 |

OTHER REFERENCES

High Frequency Measurements, by Hund, first edition, McGraw-Hill, 1933, pages 192–195. Copy in Div. 48.